US006188325B1

(12) United States Patent
Vogel

(10) Patent No.: US 6,188,325 B1
(45) Date of Patent: *Feb. 13, 2001

(54) LONG DISTANCE REMOTE CONTROL

(76) Inventor: Peter Samuel Vogel, 28 Adeline Street, Faulconbridge, NSW 2776 (AU)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/102,507

(22) Filed: Aug. 5, 1993

Related U.S. Application Data

(63) Continuation of application No. 07/841,296, filed on Feb. 28, 1992, now abandoned, which is a continuation of application No. 07/582,878, filed on Oct. 12, 1990, now abandoned.

(30) Foreign Application Priority Data

May 4, 1988 (AU) .................................................. PI8040
May 3, 1989 (WO) ................................ PCT/AU89/00188

(51) Int. Cl.[7] ...................................................... H04Q 1/00
(52) U.S. Cl. .................................. 340/825.69; 358/194.1
(58) Field of Search ........................ 340/825.24, 825.06, 340/825.69, 825.72; 358/194.1

(56) References Cited

U.S. PATENT DOCUMENTS

| | | | | |
|---|---|---|---|---|
| 4,430,652 | * | 2/1984 | Rothenbuhler et al. | 340/825.69 |
| 4,599,745 | | 7/1986 | Baran et al. . | |
| 4,603,325 | * | 7/1986 | Marino et al. | 340/539 |
| 4,706,121 | * | 11/1987 | Young | 340/825.22 |
| 4,746,919 | * | 5/1988 | Reitmeir | 340/825.69 |
| 4,885,579 | * | 12/1989 | Sandbank | 340/825.69 |
| 4,897,718 | * | 1/1990 | Testin et al. | 358/194.1 |
| 4,959,721 | * | 9/1990 | Micic et al. | 340/825.69 |
| 5,852,478 | | 12/1998 | Kwoh . | |

FOREIGN PATENT DOCUMENTS

| | | | |
|---|---|---|---|
| 6870281 | * | 3/1981 | (AU) . |
| 6870281 | | 10/1981 | (AU) . |
| 1134383 | | 7/1983 | (AU) . |
| 1134383 | * | 1/1987 | (AU) . |
| 2396372 | | 1/1979 | (FR) . |
| 1472035 | * | 4/1977 | (GB) . |
| 2140182 | | 11/1984 | (GB) . |
| 2149947 | | 6/1985 | (GB) . |

* cited by examiner

*Primary Examiner*—Brian Zimmerman
(74) *Attorney, Agent, or Firm*—IP Group of Pillsbury Madison & Sutro LLP

(57) ABSTRACT

An electronic appliance equipped with an infra-red or ultrasonic remote control device in which the device is controlled from a great distance by receiving control signals transmitted from a remote station (6), reformatting the control signals (3) in the device to controm with the protocol required by the appliance to be controlled, and transmitting the infra-red (5) or ultrasonic signal to the appliance.

24 Claims, 2 Drawing Sheets

LONG DISTANCE REMOTE CONTROL

This is a continuation of application Ser. No. 07/841,296, filed on Feb. 28, 1992, which was abandoned upon the filing hereof, which was a continuation of application Ser. No. 07/582,878, filed on Oct. 12, 1990, abandoned.

TECHNICAL FIELD

The present invention relates to methods of, and apparatus for, remotely controlling the function of electronic or electro-mechanical appliances.

BACKGROUND ART

Appliances equipped with remote control capability are now commonplace, and have proved very popular as they enable the operator of the appliance to effect changes in the operation of the appliance without having to come into physical contact with it. For extra convenience, modern remote control systems do not require an electrical connection between controller and appliance, signalling being achieved by means of suitably-modulated ultrasonic, radio-frequency or infra-red energy. Functions achievable using appliance remote controls include selection of tracks to be played from a compact disk, starting or stopping recording of a video tape recorder, selection of channel on a television receiver, and so on.

Although prior-art infra-red or ultrasonic remote control schemes operate satisfactorily over small distances, usually within the same room as the controlled appliance, it is not possible to operate appliances over great distances. For example it is not possible to start a video recorder from an office several kilometers distant.

Some appliances have been made utilising radio remote control, which permits operation over larger distances, but ultrasonic or infra-red systems are almost universally are far more popular as these systems do not suffer the problem of interference between controllers which often occurs using a radio system. As a result, it is not possible to control the majority of appliances over large distances using the supplied controller.

The present invention overcomes this limitation, providing means and method for controlling commonly-available appliances over large distances without need to modify the appliance.

DISCLOSURE OF INVENTION

According to the present invention there is provided a method of electronic appliance remote control capable of operation of appliances over unlimited distances, comprising the steps of transmitting a control signal from a distant control point, receiving and demodulating said control signal, reformatting said demodulated signal to correspond to control codes suitable for reception by the remote-control input of an appliance to be controlled (said input being for example the standard infra-red remote control receiver of a domestic appliance), and transmitting said code to the appliance to be controlled.

In another aspect the invention consists in long-distance remote control apparatus, receiving means equipped to receive and demodulate a control signal from a control signal transmitter, a controller equipped to reformat said demodulated control signal to correspond to a control code suitable for transmission to an appliance to be controlled, and transmission means for transmitting said code to an appliance to be controlled.

An additional inventive feature which may be included with advantage, is the provision of means for automatically modifying the control code sent to the appliance on receipt of a radio signal conditional upon the current operational condition of the appliance. This feature is of particular benefit in cases where the control means of the appliance to be controlled has been designed assuming that the operator will be in close proximity to the appliance, and will therefore be able to take into account its current operational condition when pressing a button to achieve a desired action. For example, many video tape recorders (VTRs) utilise a remote control scheme whereby channel selection is achieved by two buttons, one of which causes the channel number to increase, the other of which causes the channel number to decrease. To select a given channel it is therefore necessary to know which channel is currently selected, so that the requisite number of increase or decrease commands can be issued.

BRIEF DESCRIPTION OF DRAWINGS

Some embodiments of the present invention will now be described with reference to the accompanying drawings in which.

MODE FOR CARRYING OUT THE INVENTION

A first embodiment will now be described with reference to schematic block diagram FIG. 1.

Figure 1:
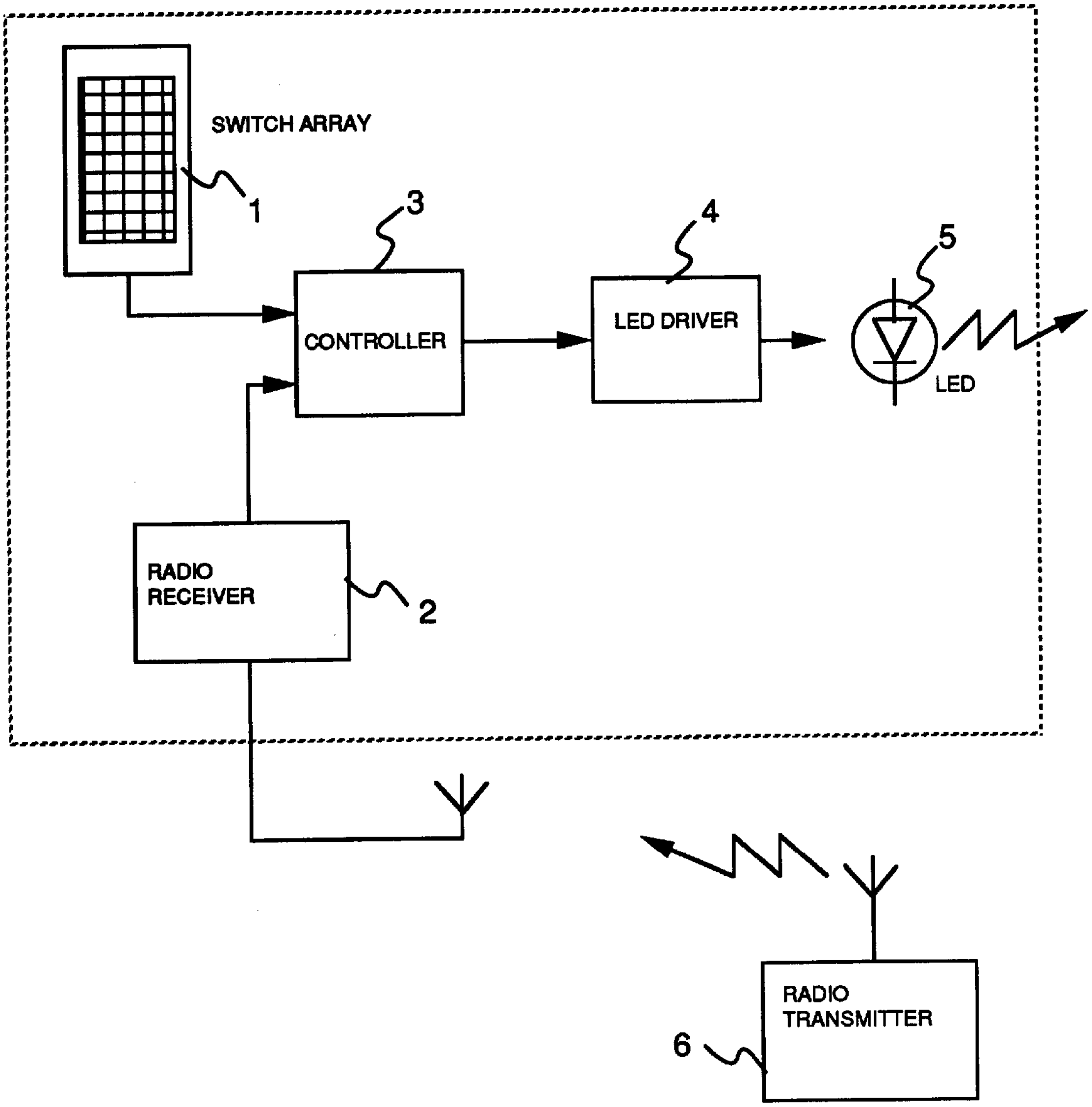
FIG. 1 is a schematic block diagram of a first embodiment of the invention.

As seen in FIG. 1, radio transmitter 6 is equipped to transmit a radio signal modulated so as to convey commands destined for the appliance to be controlled (not shown). Any of a number of suitable modulation and encoding techniques, well known to the radio communications art, can be employed with good results. Sources of commands to radio transmitter 6 can include other electronic or electro-mechanical devices or a human operator.

Radio receiver 2 is equipped to receive, demodulate and decode the transmissions of radio transmitter 6. The output of radio receiver 2, which is in a suitably decoded digital form, is fed to controller 3. Controller 3 reformats the decoded signal from radio receiver 2, so that the output of the controller, after processing by LED driver 4, is suitable for modulating an infra-red transmitter LED 5. If the encoding scheme used for communication between radio transmitter 6 and radio receiver 2 is significantly different from the encoding scheme used by the in-built remote control means of the appliance to be controlled, the reformatting process can conveniently be performed using a look-up table stored in a suitable non-volatile memory. This look-up table must be programmed to establish the desired correspondence between received radio codes and appliance control codes. This technique is particularly well suited in circumstances where a centralised radio transmitter is to be used to broadcast control signals to a number of receiving stations for the control of a variety of appliances, in which case the appliance control code which must be generated to perform a given operation at each receiving site may differ according to the particular model of appliance used at each site.

The control signal transmitted by LED 5 is directed to the appliance to be controlled, so that on receipt of a suitable radio signal by radio receiver 2 the appliance responds accordingly.

By transmitting suitable messages from a distant transmitter, the present invention can therefore be used to remotely control appliances from locations beyond the operating range of the infrared control link. In order to allow individual users of the present invention to access only their own appliances, radio receiver 2 can be equipped with address decoding means so that the device will respond only to control messages addressed to that device.

Switch array 1 is an optional control device which allows an operator located close to the appliance to be controlled to manually activate controller 3, so that the appliance can be activated by pushing buttons as well as by receipt of remote radio transmissions.

Figure 2:
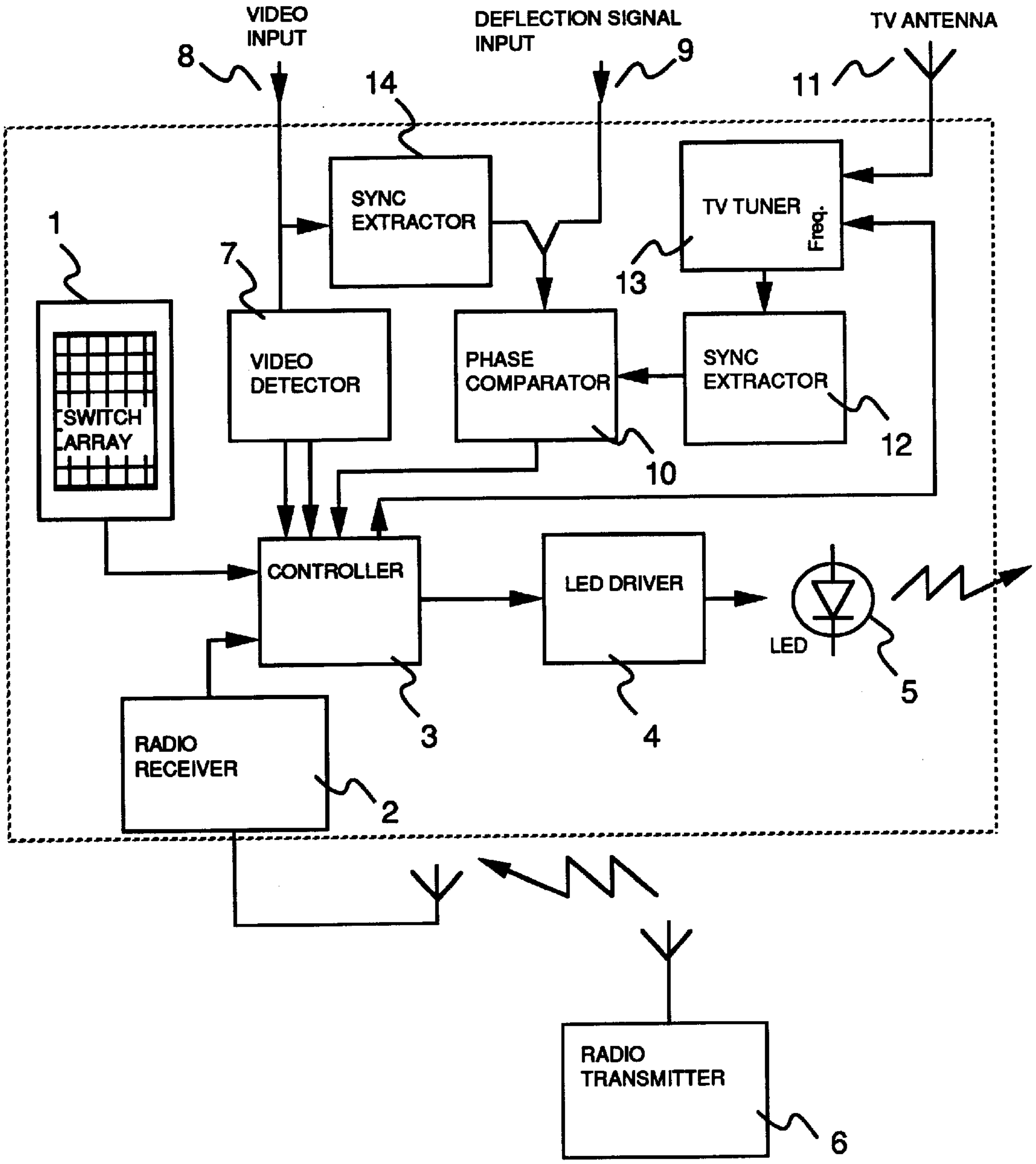
FIG. 2 is a schematic block diagram of another embodiment of the invention, adapted for use with television receiving or television recording appliances.

An embodiment comprising additional inventive features directed at providing a remote control system particularly useful for the control of television receiving and recording appliances will now be described with reference to FIG. 2 of the drawings. The embodiment of FIG. 2 is arranged to overcome certain limitations of the embodiment of FIG. 1 which may arise in circumstances where the correct code to transmit to the appliance to be controlled, such as a television receiver (TV) or video tape recorder (VTR), to achieve a certain action depends on the instantaneous operating condition of the appliance.

For example, some types of VTR are designed so that receipt of a "pause" code causes the tape to pause if it is moving, or resume moving if paused. This is a convenient arrangement in the case of a remote control being used in close proximity to the VTR, where it is possible for the operator to ascertain whether the tape is moving or not, but in the case of the embodiment of FIG. 1, where the command is being issued from a great distance, sending a "pause" signal with the intention of pausing the tape may actually cause the tape to start, if it has previously been "paused".

Another case where controlling an appliance becomes problematic when the operational condition is not readily apparent arises with TVs equipped with a remote control handset capable only of effecting "channel up" and "channel down" commands. Because the person at the distant control location does not necessarily know which channel is currently selected on the TV, it is not sufficient to provide "channel up" and "channel down" commands to the user of the present invention. It is desirable to provide commands such as "select channel 2", and this is achieved in this embodiment of the invention by suitably intelligent generation of multiple "channel up" and "channel down" codes which are transmitted to the TV to traverse the appropriate number of channels to arrive at the channel selected by the operator at a distant point.

While such such uncertainties can be accommodated fairly simply by keeping a record of all previous commands issued in cases where an embodiment of the present invention is the only source of control signals to the appliance, such schemes fail in cases where control of the appliance is effected by other additional means. For example, a VTR may be activated automatically by a timer set for automatic recording, or the channel being viewed on the TV may be arbitrarily selected by the operator using the channel selector of the TV.

The embodiment of FIG. 2 overcomes these difficulties by monitoring the operational condition of the TV or VTR and applying suitable intelligence to the generation of appropriate codes.

Referring now to FIG. 2, it will be seen that the arrangement of the first embodiment of FIG. 1 is retained and operates similarly, except that certain extra inputs and outputs have been added to controller 3 to enable sensing of the operational condition of the controlled appliance.

Video input 8 originates from the video output of a VTR being controlled and is a standard video signal normally provided by VTRs for connection to video monitors. Video input 8 feeds video detector 7, which comprises suitable circuitry to generate a logic signal reflecting the presence or absence of a video signal, and also a signal indicating whether or not the average luminance level of the video signal is changing. Such detectors are well known, and commonly rely upon the presence or absence of easily identified sync pulses as the criterion for presence or absence of a video signal, and detect changes in the average video amplitude as an indication of changing picture information.

Controller 3, which preferably includes a programmed microprocessor, reads the outputs of video detector 7 and uses this information to determine the condition of the VTR, being in this embodiment one of:

a) No video (off)

b) Video, not changing (tape paused)

c) Video, changing (tape playing or recording)

Data indicating which of these conditions is current is stored in a memory location reserved for this purpose.

The control codes generated by controller 3 in response to commands received by radio receiver 2 are then modified according to the condition of the VTR, as indicated by the outputs of video detector 7. For example, if a "pause" signal is received by controller 3 from radio receiver 2, controller 3 determines whether the VTR is currently playing or recording, by reference to the appropriate memory location. If it is currently playing or recording, the infra-red control code required to pause the VTR is looked up from memory and transmitted via LED 5 to the VTR, which pauses in response. If the tape is already paused when the pause command is received, no code is transmitted to the VTR. Similarly, on reception of a "resume" command, if the VTR is currently paused, the code required to resume recording is transmitted to the VTR. Depending on the requirements of the particular VTR with which the invention is being used, this code might, for example, be a "pause" code or a "record" code. If the VTR condition is recorded as "No video (off)" at the time of reception of a "resume" command, the code to cause the VTR to switch on and begin recording is generated.

Deflection signal input 9 receives the deflection signal generated by a TV being controlled by an embodiment of the invention. This input typically originates from a transducer capable of receiving the deflection signals of the TV, for example the magnetic field radiated by the deflection coils of the TV, allowing sensing of the deflection signals without necessitating electrical connection to the TV. Deflection signal input 9 feeds one input of a phase comparator 10. As an alternative to using deflection signal input 9 as a source of sync pulses, video input 8 can be used. In this case, sync extractor 14 feeds sync pulses from the video input to phase comparator 10. The second input of phase comparator 10 is fed a reference sync signal arriving from TV tuner 13 via sync extractor 12. Controller 3 is arranged to constantly monitor the output of phase comparator 10. The channel being received by TV tuner 13 is controlled by controller 3, which causes each of the available channels in turn to be selected, while comparing the phase of the sync signal being received by the tuner with that of the video signal from the video input or the deflection signal. When the two sync signals coincide, controller 3 assumes that the channel currently selected by TV tuner 13 is the same as the channel being recorded by the VTR. Controller 13 then stops selecting different channels, and records the current channel number in a memory location reserved for this purpose. If a difference in phase is subsequently detected, the process is repeated and the correct channel number recorded.

On receipt of a channel selection command, controller 3 uses the current channel number stored in memory to determine to which channel the VTR is tuned, and hence generate "channel up" and "channel down" codes as appropriate to access the requested channel.

The ability to determine the channel being received can also be used to advantage when operation of the appliance is to be made conditional on the channel being recorded or viewed. For example, it is possible to implement a command such as "pause the VTR if it is currently recording channel 2".

This aspect of this embodiment of the invention is particularly advantageous when the invention is used to control a VTR for the purpose of pausing recording of a television programme during commercial breaks, so that when the tape is replayed, the programme will be viewed without interruption by commercials.

In this application, radio transmitter 6 is operated by a person monitoring television broadcasts. When a commercial is seen to commence on one of the available television channels being monitored, this person causes a "pause" signal to be transmitted. The "pause" signal comprises data indicating to which channel the pause relates (that is, on which channel a commercial has commenced), and data indicating that the signal corresponds to a "pause". Similarly, on resumption of programme, the person monitoring causes a "resume" signal to be transmitted.

On receipt of these signals, radio receiver 2 of this embodiment of the invention feeds the demodulated data to controller 3. Controller 3 recognises the signal as the "pause" or "resume" type, and compares the received channel-identifying data with the current channel stored in memory. If the channels match, controller 3 causes recording to pause or resume by issuing the appropriate commands, taking into account the current VTR condition in the manner described above.

This embodiment of the invention can be simplified, if considered cost-effective, by using only one radio receiver to perform the functions of both radio receiver 2 and TV tuner 12. This simplification may or may not be desirable depending on whether the frequency ranges required for each function are similar and depending on complexity of the multiplexing circuitry required to effect the sharing of this resource. The tuner can also be used for determining which channel is being received by the VTR by tuning to the radio frequency carrier output of the VTR instead of using the direct video output of the VTR as described above.

The foregoing describes only some embodiments of the present invention and modifications, obvious to those skilled in the art, can be made without departing from the scope of the present invention. In particular, it should be noted that radio transmitter 6 of these embodiments is nominated only by way of example of suitable means of transmitting control signals from the distant control point to the control signal receiver of the present invention and any other transmission means can be used without departing from the scope of the invention. Examples of other suitable means include electrical cable with or without carrier signals and fibre optic.

Other beneficial modifications are also envisaged. Whereas in the embodiments described herein the invention includes unique address decoding means for the purpose of accessing each user's device individually, the invention can also be equipped to respond to a "broadcast" address, that is a special addressing code which allows access to all devices simultaneously so that control signals applicable to multiple users of the invention, such as "pause" commands destined for video tape recorders during the broadcasting of television commercials, can be simultaneously acted upon.

It is also envisaged that, to activate an appliance from a great distance, a user of the present invention can either personally activate a suitably equipped transmitter or can request, for example via telephone, a suitable code to be transmitted from a central transmitting station. Using the latter arrangement, a user can request that his appliances be caused to function according to a schedule, for example, he can request that his video tape recorder be activated to record at such times as a particular television series is being broadcast.

A number of additional convenient features can be added to the invention as described in the above embodiments. For example by including calendar and/or clock functions the present invention can be used to automatically activate appliance functions at pre-determined times. By including suitable transducers it can cause appliances to be activated on detection of a particular stimulus such as a noise or light, achieving functions such as turning on a radio receiver when the doorbell rings or when night falls.

Whereas the present invention is described above in relation to remote control of domestic appliances, it is equally applicable to any other electronic or electro-mechanical equipment.

Whereas the present invention as described above utilises infrared light for signalling between it and the appliance to be controlled, it can be realised using other signalling means including inter alia ultrasonic or radio waves.

It will be understood by those skilled in the art that the present invention can be implemented using any of the available technologies well known to those skilled in the electronic art, including discrete electronic components, specially designed integrated circuits or microprocessor components equipped with suitable software.

Whereas the embodiments of the invention described herein utilise a particular arrangement of means for sensing the condition of the TV or VTR being controlled, other means can be used with good results. For example, identification of currently-received channel can be effected by comparing the video and audio components of two television signals, rather than by comparing the phase of their sync signals, as described in relation to the embodiments above.

To further enhance the versatility of the embodiments of the invention described herein, the infra-red transmitting LED of the present invention is preferably located in close proximity to the appliance to be controlled, but when such location is not suitable for transmission of infra-red signals from the LED to the appliance due to location of the infra-red receiver of the appliance, the infra-red transmitter of the present invention can be located on an adjustable external protrusion, such as a flexible stalk, which can be adjusted by the user so as to bring the transmitter within the field of reception of the receiver. Alternatively, a light-pipe, optical fibre or reflector arrangement can be used for the same purpose.

INDUSTRIAL APPLICABILITY

Many electronic appliances are designed to be controlled by a hand-held remote control located within close proximity to the appliance. The present invention provides a system for controlling such appliances from a distance greater than that over which the appliance's conventional remote control device will function. An application of the invention is use for controlling domestic video cassette recorders from a distant central office for the purpose of causing certain television programmes to be automatically recorded.

What is claimed is:

1. A method of controlling a device, comprising:

transmitting an information signal from a first transmitter;

transmitting a control signal from a second transmitter, said control signal being indicative of a predetermined target condition, said second transmitter disposed apart from a receiving device;

receiving said information signal at a receiving station;

applying said received information signal to said receiving device at said receiving station;

receiving said control signal at an intermediate station;

sensing an operational condition of said receiving device, when said receiving device is in a power-on condition;

formatting said received control signal according to said sensed operational condition to form control codes suitable for reception by an input of said receiving device;

using a third transmitter to modulate a carrier on the basis of said control codes; and applying the modulated carrier from said third transmitter to an input of said receiving device to cause said receiving device to enter said predetermined target operational condition, wherein the sensing of the operational condition of said receiving device further comprises:

receiving a sequence of signals from a controller; and calculating a current operational condition of the receiving device according to said sequence of received signals.

2. The method of controlling a device as claimed in claim 1, wherein the step of sensing the operational condition of said receiving device includes the sub-step of sensing which one of a plurality of information channels is being received by said receiving device; and the step of formatting said received control signal according to said sensed operational condition includes the sub-step of:

generating a number of channel-up or channel-down steps required to cause said receiving device to select a channel specified by a received channel select control signal, according to a difference between said sensed television channel and the received channel select control signal.

3. The method of controlling a device as claimed in claim 1, wherein the step of sensing the operational condition of said receiving device includes the sub-steps of:

sensing if said receiving device is paused; and sensing if said receiving device is stopped; and the step of formatting said received control signal according to said sensed operational condition includes the sub-steps of:

generating a record code when a resume-recording code is received if said operational condition sensing step indicates that said receiving device is stopped;

generating a pause code when a resume-recording code is received if said operational condition sensing step indicates that said receiving device is paused; and generating a pause code when a pause-recording code is received if said operational condition sensing step indicates that said receiving device is not paused.

4. The method of controlling a device as claimed in one of claims 1, wherein said information signal is a television signal.

5. The method controlling a device as claimed in one of claims 1, wherein said receiving station is remote from said transmitters.

6. The method of controlling a device as claimed in one of claims 1, wherein said receiving device is a video recorder.

7. A method of controlling a device as claimed in one of claims 1, wherein said carrier is an infra-red light beam.

8. A method of controlling a device as claimed in one of claims 1, wherein said receiving device input is a remote control input.

9. A method of controlling a device, comprising:

transmitting an information signal from a first transmitter;

transmitting a control signal from a second transmitter, second transmitter disposed apart from a receiving device;

receiving said information signal at said receiving station;

applying said received information signal to a receiving device at said receiving station, said receiving device being one of a first receiving device type responsive to a first command for achieving a predetermined operational state and a second receiving device type responsive to a second command for achieving the same predetermined operational state;

receiving said control signal at an intermediate station;

sensing an operational condition of said receiving device, when said receiving device is in a power-on condition;

formatting said received control signal according to said sensed operational condition and said receiving device type to form control codes suitable for reception by an input of said receiving device;

using a third transmitter to modulate a carrier on the basis of said control codes; and applying the modulated carrier from said third transmitter to an input of said receiving device to achieve said predetermined operational state, wherein the sensing of the operational condition of said receiving device further comprises:

receiving a sequence of signals from a controller; and calculating a current operational condition of the receiving device according to said sequence of received signals.

10. The method of controlling a device as claimed in claim 9, wherein the step of sensing the operational condition of said receiving device includes the sub-step of sensing which one of a plurality of information channels is being received by said receiving device; and the step of formatting said received control signal received by said receiving device includes the sub-step of generating a number of channel-up or channel-down steps required to cause said receiving device to select a channel specified by a received channel select control signal, according to a difference between said sensed television channel and the received channel select control signal.

11. The method of controlling a device as claimed in claim 9, wherein the step of sensing the operational condition of said receiving device includes the sub-steps of:

sensing if said receiving device is paused; and sensing if said receiving device is stopped; and the step of formatting said control signal received by said receiving device includes the sub-steps of:

generating a record code when a resume-recording code is received by said receiving device if said operational condition sensing step indicates that said receiving device is stopped;

generating a pause code when a resume-recording code is received by said receiving device if said operational condition sensing step indicates that said receiving device is paused; and generating a pause code when a pause-recording code is received by said receiving device if said operational condition sensing step indicates that said receiving device is not paused.

12. A device controller, comprising:

a first transmitter which transmits an information signal;

a second transmitter which transmits a control signal from a second transmitter, said control signal being indicative of a predetermined target condition;

a receiving station which receives said information signal;

a receiving device at said receiving station to which said received information signal is applied; and an intermediate station which receives said control signal;

a third transmitter which modulates a carrier on the basis of control codes, wherein an operational condition of said receiving device is sensed, wherein said received control signal is formatted according to said sensed operational condition to form said control codes suitable for reception by an input of said receiving device, and wherein the modulated carrier from said third transmitter is applied to an input of said receiving device to cause said receiving device to enter said predetermined target operational condition, wherein when the operational condition of said receiving device is sensed, a sequence of signals is received from a controller; and a current operational condition of the receiving device according to said sequence of received signals is calculated.

13. The device controller as claimed in claim 12, wherein when the operational condition of said receiving device is sensed, whether said receiving device is in a power-on condition is also sensed; and wherein when said received control signal is formatted according to said sensed operational condition, a start code is prefaced with a power-on code if a power-on condition is not sensed when said operational condition is sensed.

14. The device controller as claimed in claim 12, wherein when the operational condition of said receiving device is sensed, which one of a plurality of information channels is being received by said receiving device is also sensed; and wherein when said received control signal is formatted according to said sensed operational condition, a number of channel-up or channel-down steps required to cause said receiving device to select a channel specified by a received channel select control signal, according to a difference between said sensed television channel and the received channel select control signal, is generated.

15. The device controller as claimed in claim 12, wherein when the operational condition of said receiving device is sensed, whether said receiving device is paused is sensed; and whether said receiving device is stopped is sensed, and wherein when said received control signal is formatted according to said sensed operational condition, a record code is generated when a resume-recording code is received if said operational condition sensed indicates that said receiving device is stopped;

a pause code is generated when a resume-recording code is received if said operational condition sensed indicates that said receiving device is paused; and a pause code is generated when a pause-recording code is received if said operational condition sensed indicates that said receiving device is not paused.

16. The device controller as claimed in one of claims 12, wherein said information signal is a television signal.

17. The device controller as claimed in one of claims 12, wherein said receiving station is remote from said transmitters.

18. The device controller as claimed in one of claims 12, wherein said receiving device is a video recorder.

19. The device controller as claimed in one of claims 12, wherein said carrier is an infra-red light beam.

20. The device controller as claimed in one of claims 12, wherein said receiving device input is a remote control input.

21. A device controller, comprising:

a first transmitter which transmits an information signal;

a second transmitter which transmits a control signal;

a receiving station which receives said information signal;

a receiving device at said receiving station to which said received information signal is applied, said receiving device being one of a first receiving device type responsive to a first command for achieving a predetermined operational state and a second receiving device type responsive to a second command for achieving the same predetermined operational state;

an intermediate station which receives said control signal; and a third transmitter which modulates a carrier on the basis of control codes, wherein an operational condition of said receiving device is sensed, wherein said received control signal is formatted according to said sensed operational condition and said receiving device type of form said control codes suitable for reception by an input of said receiving device, and wherein the modulated carrier from said third transmitter is applied to an input of said receiving device to achieve said predetermined operational state, wherein when the operational condition of said receiving device is sensed, a sequence of signals is received from a controller; and a current operational condition of the receiving device according to said sequence of received signals is calculated.

22. The device controller as claimed in claim 21, wherein when the operational condition of said receiving device is sensed, whether said receiving device is in a power-on condition is also sensed; and wherein when said control signal received by said receiving device is formatted, a start code is prefaced with a power-on code if a power-on condition is not sensed when said operational condition is sensed.

23. The device controller as claimed in claim 21, wherein when the operational condition of said receiving device is sensed, which one of a plurality of information channels is being received by said receiving device is also sensed; and wherein when said received control signal received by said receiving device is formatted, a number of channel-up or channel-down steps required to cause said receiving device to select a channel specified by a received channel select control signal, according to a difference between said sensed television channel and the received channel select control signal, is generated.

24. The device controller as claimed in claim 22, wherein when the operational condition of said receiving device is sensed, whether said receiving device is paused is sensed; and whether said receiving device is stopped is sensed, and wherein when said control signal received by said receiving device is formatted, a record code is generated, when a resume-recording code is received by a receiving device if said sensed operational condition indicates that said receiving device is stopped;

a pause code is generated, when a resume-recording code is received by said receiving device if said sensed operational condition indicates that said receiving device is paused; and a pause code is generated, when a pause-recording code is received by said receiving device if said sensed operational condition indicates that said receiving device is not paused.

* * * * *